(12) United States Patent
Goh et al.

(10) Patent No.: US 9,385,396 B2
(45) Date of Patent: Jul. 5, 2016

(54) BATTERY CELL OF CURVED SHAPE AND BATTERY PACK EMPLOYED WITH THE SAME

(71) Applicant: LG CHEM, LTD., Seoul (KR)

(72) Inventors: Eun-Young Goh, Daejeon (KR); Byungjin Choi, Daejeon (KR); Hyang Mok Lee, Daejeon (KR); Hyun-Chul Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 295 days.

(21) Appl. No.: 14/098,039

(22) Filed: Dec. 5, 2013

(65) Prior Publication Data

US 2014/0090236 A1    Apr. 3, 2014

Related U.S. Application Data

(63) Continuation of application No. 12/922,005, filed as application No. PCT/KR2009/001189 on Mar. 10, 2009, now Pat. No. 8,802,261.

(30) Foreign Application Priority Data

Mar. 12, 2008 (KR) .................. 10-2008-0023054

(51) Int. Cl.
*H01M 10/04* (2006.01)
*H01M 2/02* (2006.01)
*H01M 4/02* (2006.01)

(52) U.S. Cl.
CPC ............ *H01M 10/04* (2013.01); *H01M 2/0275* (2013.01); *H01M 10/049* (2013.01); *H01M 10/0436* (2013.01); *H01M 2/0287* (2013.01); *H01M 10/0459* (2013.01); *H01M 2002/0205* (2013.01); *H01M 2004/025* (2013.01); *H01M 2220/30* (2013.01); *H01M 2250/30* (2013.01); *Y02B 90/18* (2013.01); *Y02E 60/12* (2013.01);

(Continued)

(58) Field of Classification Search
None
See application file for complete search history.

(56) References Cited

U.S. PATENT DOCUMENTS

| 5,556,722 | A | 9/1996 | Narukawa et al. |
| 6,877,216 | B2 | 4/2005 | Fukuda et al. |
| 7,049,028 | B2 | 5/2006 | Notten et al. |

(Continued)

FOREIGN PATENT DOCUMENTS

| CN | 1395750 A | 2/2003 |
| EP | 0 928 035 A1 | 7/1999 |

(Continued)

OTHER PUBLICATIONS

International Search Report for PCT/KR2009/001189 mailed Oct. 27, 2009.

*Primary Examiner* — Carlos Barcena
*Assistant Examiner* — Wojciech Haske
(74) *Attorney, Agent, or Firm* — Birch, Stewart, Kolasch & Birch, LLP

(57) ABSTRACT

Disclosed herein is a battery cell configured such that an electrode assembly of a cathode/separator/anode stack structure is mounted in a changeable cell case in a state in which the electrode assembly is impregnated with an electrolyte, wherein the electrode assembly and the cell case are curved in the same direction on axial vertical sections thereof in a state in which opposite ends of the electrode assembly and opposite ends of the cell case are directed in the same direction about a middle part of the electrode assembly and a middle part of the cell case.

11 Claims, 2 Drawing Sheets

(52) U.S. Cl.
CPC ........ *Y10T 29/4911* (2015.01); *Y10T 29/49108* (2015.01)

(56) References Cited

U.S. PATENT DOCUMENTS

| | | |
|---|---|---|
| 7,074,520 B2 | 7/2006 | Probst et al. |
| 7,163,762 B2 | 1/2007 | Endo et al. |
| 2003/0108787 A1 | 6/2003 | Endo et al. |
| 2004/0029001 A1 | 2/2004 | Yamazaki et al. |
| 2007/0059595 A1 | 3/2007 | Endo et al. |

FOREIGN PATENT DOCUMENTS

| | | |
|---|---|---|
| EP | 0 996 179 A1 | 4/2000 |
| JP | 11-307130 A | 11/1999 |
| KR | 2001/0082058 A | 8/2001 |
| KR | 2001-0082059 A | 8/2001 |
| KR | 2001-0082060 A | 8/2001 |
| WO | WO 00/17950 A1 | 3/2000 |
| WO | WO 01/82393 A2 | 11/2001 |
| WO | WO 02/43178 A1 | 5/2002 |

300

BATTERY CELL OF CURVED SHAPE AND BATTERY PACK EMPLOYED WITH THE SAME

CROSS-REFERENCE TO RELATED APPLICATIONS

This application is a Continuation of co-pending U.S. application Ser. No. 12/922,005 filed on Jan. 11, 2011, which is a National Stage of PCT/KR2009/001189 filed on Mar. 10, 2009, which claims priority to Korean Application No. 10-2008-0023054 filed on Mar. 12, 2008. The entire contents of all of the above applications are hereby incorporated by reference.

TECHNICAL FIELD

The present invention relates to a curved battery cell and a battery pack including the same, and, more particularly, to a battery cell configured such that an electrode assembly of a cathode/separator/anode stack structure is mounted in a changeable cell case in a state in which the electrode assembly is impregnated with an electrolyte, wherein the electrode assembly and the cell case are curved in the same direction on axial vertical sections thereof in a state in which opposite ends of the electrode assembly and opposite ends of the cell case are directed in the same direction about a middle part of the electrode assembly and a middle part of the cell case.

BACKGROUND ART

As mobile devices have been increasingly developed, and the demand for such mobile devices has increased, the demand for secondary batteries has also sharply increased as an energy source for the mobile devices. Among such secondary batteries is a lithium secondary battery having high energy density and high discharge voltage, on which much research has been carried out and which is now commercialized and widely used.

In terms of the shape of batteries, the demand for prismatic secondary batteries or pouch-shaped secondary batteries, which are thin enough to be applied to products, such as mobile phones, is very high. In terms of the material for batteries, the demand for lithium secondary batteries, such as lithium ion batteries and lithium ion polymer batteries, having high energy density, high discharge voltage, and high power stability, is very high.

The size and thickness of electronic devices have been increasingly reduced so as to satisfy liking of consumers. For this reason, the reduction in size and thickness of secondary batteries is also required so as to maximize space utilization. Therefore, it is necessary to provide various shapes of the secondary batteries corresponding to the shapes of the electronic devices and, in addition, to efficiently utilize the internal space of each of the electronic devices.

In particular, in recent years, designs of the electronic devices have played a very important role when consumers choose the electronic devices. For this reason, various designs are provided in place of a flat type design. For example, electronic devices, such as mobile phones and laptop computers, may be designed such that the electronic devices can be curved in an ergonomic manner.

A plurality of curved electronic devices has been developed and commercialized; however, most of the manufactured batteries are configured in a flat shape. As a result, space utilization is low, and it is difficult to mount batteries in the respective electronic devices due to such low space utilization. When external impact is applied to the electronic devices, therefore, the batteries may freely move in the respective electronic devices, with the result that the batteries may be damaged.

In order to mount a battery in an electronic device configured such that a battery mounting region, in which the battery will be mounted, is curved, therefore, it is required to curve the battery such that the battery is stably mounted in the curved battery mounting region of the electronic device.

Some technology for curving an electrode assembly has been proposed. For example, US Patent Application Publication No. 2007/0059595 disclosed a battery having a jelly-roll type electrode assembly configured such that a section of the electrode assembly perpendicular to a winding axis is curved. According to this disclosure, the curve is formed through thermal pressing using a concave heater and a convex heater.

Also, Japanese Patent Application Publication No. 1999-307130 discloses a method of thermally pressing a stack type electrode assembly using two rolls having different diameters to manufacture a battery configured in a curved structure.

According to the above disclosures, however, the electrode assembly is directly thermally pressed, with the result that deterioration of the battery occurs, which is very serious. In addition, the former technology is applied to the winding type electrode assembly (jelly-roll), with the result that larger stress occurs at the middle part of the electrode assembly on which stress is concentrated, and therefore, shape deformation, such as twisting, of the electrode assembly is great. On the other hand, the latter technology is applied to the stack type electrode assembly, with the result that, when the electrode assembly is pressed using the heating rolls, some electrode plates are nonuniformly pushed due to shear stress, and therefore, a short circuit may occur at opposite ends of the electrode assembly.

Furthermore, the above technology curves the electrode assembly, and therefore, it is necessary to curve a battery case in the same manner. Also, when an electrolyte is injected in to the battery case in a state in which the curved electrode assembly is mounted in the battery case, stress immanent in the electrode assembly during curving the electrode assembly is restored by a plasticizing action of the electrolyte, and therefore, the ends of the electrode assembly are pressed by the inside of the battery case, with the result that a possibility of a short circuit is increased.

Therefore, there is a high necessity for a secondary battery (battery cell) which is gently curved in the axial direction thereof, thereby solving the above-mentioned problems.

DISCLOSURE

Technical Problem

Therefore, the present invention has been made to solve the above problems, and other technical problems that have yet to be resolved.

As a result of a variety of extensive and intensive studies and experiments to solve the problems as described above, the inventors of the present application have found that when a battery cell, having a changeable cell case and configured such that the battery cell curved on the axial vertical section thereof in a state in which the opposite ends of the battery cell are directed in the same direction about the middle part of the battery cell, is mounted in an electronic device the external shape of which is curved, it is possible to maximize space utilization, to develop electronic devices having various designs satisfying liking of consumers, and to solving the above-mentioned problems, such as a short circuit. The present invention has been completed based on these findings.

Technical Solution

In accordance with one aspect of the present invention, the above and other objects can be accomplished by the provision of a battery cell configured such that an electrode assembly of a cathode/separator/anode stack structure is mounted in a changeable cell case in a state in which the electrode assembly is impregnated with an electrolyte, wherein the electrode assembly and the cell case are curved in the same direction on axial vertical sections thereof in a state in which opposite ends of the electrode assembly and opposite ends of the cell case are directed in the same direction about a middle part of the electrode assembly and a middle part of the cell case.

Consequently, when the battery cell according to the present invention, which is curved in the axial direction thereof, is mounted in an electronic device the external shape of which is curved or in an electronic device the external shape of which is flat but which is configured such that a battery mounting region thereof is curved, the tight contact between the battery cell and the electronic device is achieved, thereby maximizing space utilization and thus providing high efficiency. Also, it is possible to develop electronic devices having various designs satisfying liking of consumers.

For example, a stack type or folding type electrode assembly may be used as the electrode assembly of the battery cell according to the present invention. In a simple stack type electrode assembly, however, some electrode plates are pushed during curving of the electrode assembly when interface friction between the electrode plates is not uniform, and therefore, the electrode plates contact each other at the ends of the electrode assembly, with the result that a short circuit may occur. In the folding type electrode assembly, on the other hand, large shape deformation, such as twisting, of the electrode assembly may occur at the middle part of the electrode assembly on which stress is concentrated, and the electrode assembly can be curved only in the winding direction thereof.

In a preferred example, the electrode assembly may be configured in a stack/folding type structure in which stack type bi cells or full-cells, as unit cells, are sequentially wound in a state in which a long separation sheet is disposed between the bi-cells or the full-cells. In such a stack/folding type electrode assembly, opposite ends of the electrode assembly are sealed by the separation sheet, and, the stacked state of the electrode plates is maintained by the winding force of the separation sheet even when the interface friction between the electrode plates is not uniform, and therefore, it is possible to prevent the occurrence of a short circuit as described above.

Details of the stack/folding type electrode assembly are disclosed in Korean Patent Application Publication No. 2001-0082058, No. 2001-0082059, and No. 2001-0082060, which has been published in the name of the applicant of the present application. The disclosures of the above-mentioned patent application publications are hereby incorporated by reference as if fully set forth therein.

According to the present invention, the cell case is changeable such that the cell case can be easily curved in a state in which the electrode assembly is mounted in the cell case. That is, the changeable cell case may be deformed by external force in a state in which the electrode assembly is mounted in the cell case. Preferably, the changeable cell case may be a pouch-shaped case formed of a laminate sheet including a metal layer and a resin layer. Preferably, therefore, the battery cell is configured in a structure in which the outer circumference of the pouch-shaped case is sealed by thermal welding in a state in which the electrode assembly is mounted in the pouch-shaped case.

The laminate sheet may be configured such that an outer resin layer exhibiting high durability is attached to one surface (outer surface) of a metal blocking layer, and a resin sealant layer exhibiting high thermal weldability is attached to the other surface (inner surface) of the metal blocking layer.

The outer resin layer must have high tolerance to external environment, and it is necessary for the outer resin layer to have predetermined tensile strength and corrosion resistance. To this end, the outer resin layer may be made of a polymer resin, such as polyethylene terephthalate (PET) or oriented nylon film.

It is required for the metal blocking layer to prevent introduction or leakage of foreign matter, such as gas or moisture, into or from the battery cell and to improve strength of the cell case. Preferably, the metal blocking layer is made of aluminum.

The resin sealant layer is made of a polymer resin which exhibits high thermal weldability (thermal adhesive property) and a low hygroscopic property, which is necessary to restrain permeation of the electrolyte, and is not expanded or is not corroded by the electrolyte, such as polyolefin, more preferably cast polypropylene (CPP).

Generally, polyolefin, particularly polypropylene, has low adhesion with metal. For this reason, an adhesion layer may be further disposed between the resin sealant layer and the metal blocking layer so as to improve adhesion between the resin sealant layer and the metal blocking layer. The adhesion layer may be made of, for example, urethane, acryl, or thermoplastic elastomer, to which, however, the material for the adhesion layer is not limited.

As previously described, the battery cell according to the present invention is gently curved on the axial vertical section thereof such that the opposite ends of the battery cell are directed in the same direction about the middle part of the battery cell. Here, that the battery cell is curved such that the opposite ends of the battery cell are directed in the same direction means that the battery cell is curved such that both the opposite ends of the battery cell are directed upward or downward.

In the battery cell according to the present invention, the electrode terminals may be provided at only one of the curved opposite ends of the electrode assembly. Alternatively, the electrode terminals may be provided at both the curved opposite ends of the electrode assembly. However, the electrode terminals may be disposed in different manners.

The electrode assembly and the cell case may be curved such that the electrode assembly and the cell case have a radius of curvature R of 50R to 150R.

That is, the radius of curvature R of the electrode assembly and the cell case may be variously adjusted based on desired shapes. However, if the radius of curvature is too small, stress is concentrated on the middle part of the battery cell, with the result that the battery cell may be twisted. On the other hand, if the radius of curvature is too large, it is difficult to control the radius of curvature, and the electrode assembly and the cell case may return to original states thereof, that is, flat states, which is not preferable.

Generally, when a plurality of plate-shaped stacked members are curved such that the stacked members have a predetermined radius of curvature, the inner stacked members have a greater strain than the outer stacked members. During charge and discharge of the secondary battery, on the other hand, active materials applied to the electrode plates repeatedly expand and contract. As a result, it is difficult to maintain the battery cell in a predetermined curved state. In a secondary battery having a small radius of curvature, i.e., a secondary battery which is greatly curved, therefore, the curved state of the secondary battery may be restored during repetitive charge and discharge of the secondary battery. In this case, the ends of the respective electrode plates are pressed by the cell case, with the result that large force is applied to the electrode plates, and the electrode plates penetrate the separators. Consequently, a short circuit may occur.

In a preferred example, therefore, the curved opposite ends of the electrode assembly and the cell case may have a radius of curvature $R_1$ greater than a radius of curvature $R_2$ of the middle parts of electrode assembly and the cell case. Specifically, the above structure is configured such that, when the electrode assembly and the cell case are curved to have an average radius of curvature R, the radius of curvature $R_2$ of the middle parts of the electrode assembly and the cell case is less than the average radius of curvature R, and the radius of curvature $R_1$ of each end of the electrode assembly and the cell case is greater than the average radius of curvature R.

In the above structure, a strain due to restoration at the opposite ends of the electrode assembly and the cell case having the large radius of curvature $R_2$ is less than a strain due to restoration at the opposite ends of the electrode assembly and the cell case a radius of curvature $R_1$ in the same condition, and therefore, when the active materials applied to the electrode plates repeatedly expand and contract during repetitive charge and discharge of the secondary battery, force applied to the ends of the electrode assembly is small, and therefore, it is possible to greatly reduce a possibility of the occurrence of a short circuit as previously described.

Also, when the electrode terminals are provided at only one of the curved opposite ends of the electrode assembly or at both the curved opposite ends of the electrode assembly, the electrode terminals are located along the curved ends of the electrode assembly, with the result that the coupling between the electrode terminals and a cap plate, such as a protection circuit module (PCM), is not easily achieved. However, when the radius of curvature $R_1$ of the opposite ends of the electrode assembly and the cell case is relatively large, a relatively gentle curve is provided, with the result that the curved angle of the electrode terminals is decreased, and therefore, it is possible to stably achieve the coupling between the electrode terminals and the cap plate.

The radius of curvature $R_1$ of the opposite ends of the electrode assembly and the cell case and the radius of curvature $R_2$ of the middle parts of electrode assembly and the cell case may be appropriately adjusted within a range to minimize a possibility of the occurrence of a short circuit as previously described. It is not necessary to provide a great difference between the radius of curvature $R_1$ of the opposite ends of the electrode assembly and the cell case and the radius of curvature $R_2$ of the middle parts of electrode assembly and the cell case. Preferably, the radius of curvature $R_1$ is 51R to 180R in a condition in which radius of curvature $R_1$ is greater than the radius of curvature $R_2$, and the radius of curvature $R_2$ is 50R to 150R.

In accordance with another aspect of the present invention, there is provided a manufacturing method of a curved battery cell having a radius of curvature R, the manufacturing method including (a) mounting an electrode assembly in a changeable battery cell, injecting an electrolyte into the cell case, sealing the battery cell so as to manufacture an upright battery cell, and initially charging and discharging the upright battery cell, (b) placing the upright battery cell between upper and lower jigs having a radius of curvature r less than the radius of curvature R and moving the upper and lower jigs toward to each other to press the upright battery cell, and (c) separating the upper and lower jigs toward from each other to remove the battery cell from the upper and lower jigs and leaving the battery cell alone for a predetermined time such that a curved state of the battery cell is partially restored, and therefore, the battery cell has the radius of curvature R.

As previously described, the conventional technology for directly curving the electrode assembly or the electrode plates has been proposed. In the conventional technology, however, severe shape deformation of the electrode assembly occurs due to expansion and contraction of the electrode plates during initial charge and discharge of the battery cell carried out after the injection of the electrolyte into the cell case. In the manufacturing method of the battery cell according to the present invention, on the other hand, only the electrode assembly is not curved, but the electrode assembly is mounted in the cell case, the electrolyte is injected into the cell case, initial charge and discharge of the resulting battery cell is performed, and the battery cell is curved at a post process. Consequently, deformation is relatively small, and heat is not directly applied to the electrode assembly, with the result that deterioration of the electrode assembly is minimized.

Also, in a case in which the electrode assembly is pressed such that the electrode assembly is curved, it is necessary to curve the cell case, in which the electrode assembly will be mounted. However, such a curving process is not easily performed, and the overall process is complicated. According to the present invention, on the other hand, the cell case is pressed together with the electrode assembly such that both the cell case and the electrode assembly can be simultaneously curved, and therefore, process efficiency is excellent.

In addition, the electrolyte in the cell case serves as a kind of plasticizer to minimize stress caused due to interface friction between the electrode plates during the execution of the pressing process, and therefore, it is possible to greatly reduce restoration of the curved battery cell due to such stress during repetitive charge and discharge of the battery cell.

In order to easily achieve such simultaneous curving, the cell case may be made of a changeable material that can be easily deformed and curved during the execution of the step (b) of pressing the battery cell.

The step (b) of pressing the battery cell is carried out to curve the outside of the battery cell. In this step, the battery cell is pressed using a jig (for example, a concave jig) having a shape corresponding to a desired curve of the battery cell and a jig (for example, a convex jig) having a shape corresponding to the shape of the concave jig.

According to circumstances, heat treatment may be carried out during the step of pressing the battery cell. In this case, heat treatment methods are not particularly restricted. For example, a heater may be mounted in at least one of the jigs such that the battery cell can be heated while being pressed.

Pressure and temperature which is applied to the battery cell during the step of pressing the battery cell is sufficient not to cause deterioration of the electrode assembly in the battery cell. Preferably, the step of pressing the battery cell is carried out at a pressure of 150 to 500 kgF and a temperature of 10 to 90° C. More preferably, the step of pressing the battery cell is carried out at a room pressure without heating.

In the step (c) of leaving the battery cell alone, stress generated in the battery cell during the execution of the step of pressing the battery cell is released to stably maintain the curved shape of the battery cell such that the battery cell has the predetermined radius of curvature R.

In accordance with a further aspect of the present invention, there is provided a battery pack configured such that the curved battery cell as described above is mounted in a pack case curved in the same shape as the battery cell.

Preferably, the battery pack is used as a power source for mobile phones. Generally, mobile phones are configured in a rectangular shape, and a battery is mounted in the lower end of each of the mobile phones. Preferably, mobile phones are designed such that a voice reception part and a voice transmission part of each of the mobile phones are located at positions corresponding to an ear and mouth of a user or near such positions. To this end, in a case in which the curved battery cell according to the present invention is used when designing a mobile phone such that the mobile phone is curved ergonomically according to the shape of a corresponding region of a human being, it is possible to maximize space utilization.

Other components of the battery pack and a manufacturing method of the battery pack are well known in the art to which the present invention pertains, and therefore, a detailed description thereof will not be given.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
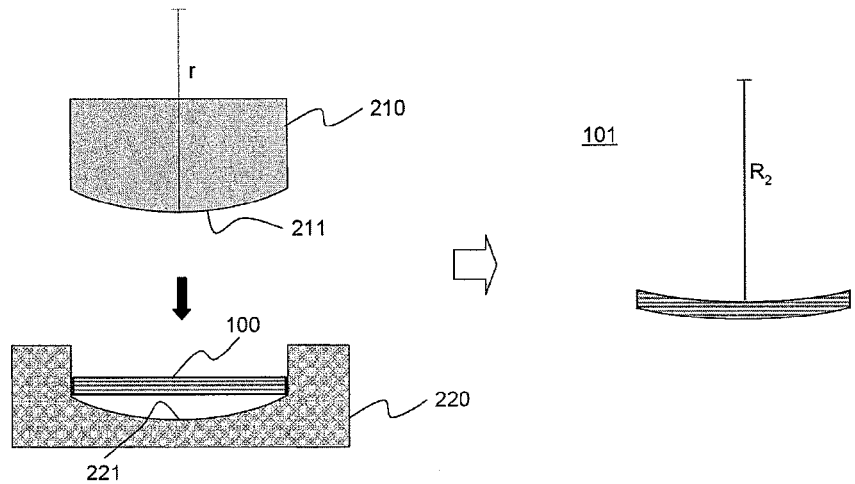
FIG. 1 is a typical view illustrating a method of manufacturing a curved battery cell having a radius of curvature R according to an embodiment of the present invention.

FIG. 1 is a typical view illustrating a method of manufacturing a curved battery cell according to an embodiment of the present invention.

Referring to FIG. 1, a curve forming apparatus includes an upper jig 210 with a convex part 211 having a radius of curvature r and a lower jig 220 with a concave part 221 having a radius of curvature r such that the lower jig 220 can be engaged with the upper jig 210. A battery cell 100 is configured such that an electrode assembly is provided in a cell case together with an electrolyte. The battery cell 100 is mounted in the concave part 221 of the lower jig 220 in the axial direction thereof such that the battery cell 100 can be curved in the axial direction thereof.

When the upper jig 210 is moved downward to the lower jig 220 so as to press the battery cell 100, the battery cell 100 is curved, with the result that the battery cell 100 has a curved shape corresponding to the shape of the upper jig 210 and the shape of the lower jig 220.

Unlike a conventional case in which the electrode assembly is directly pressed while heat is applied to the electrode assembly, therefore, the electrode assembly is placed in the cell case, the shape of which is changeable and the electrolyte is injected into the cell case to manufacture a battery cell, the manufactured battery cell is initially charged and discharged, and then the pressing process, as a post process, is carried out with respect to the battery cell. As a result, the deterioration of the electrode assembly is minimized. Furthermore, the electrolyte in the cell case serves as a kind of plasticizer to minimize stress caused due to interface friction between electrode plates during the execution of the pressing process, and therefore, it is possible to greatly reduce restoration of the battery cell due to such stress during charge and discharge of the battery cell.

Meanwhile, the pressing process is preferably carried out in room temperature. As needed, on the other hand, a predetermined heat treatment may be further carried out. To this end, a heater (not shown) may be mounted in the upper jig 210 and/or in the lower jig 220.

After the execution of the pressing process, the jigs 210 and 220 are separated from each other to remove the battery cell 100 from the jigs 210 and 220, and then the battery cell 100 is left alone for a predetermined time such that the curved state of the battery cell is partially restored, and therefore, the battery cell has a radius of curvature R. As a result, the stress applied to the battery cell 100 through the pressing process is released, and therefore, the curved shape of the battery cell is stably maintained. A manufactured battery cell 101 has a shape in which the battery cell 101 is curved such that opposite ends of the battery cell 101 are directed in the same direction. The radius of curvature R of the battery cell 101 may be equal to or greater than the radius of curvature r of the upper jig 210.

Figure 2:
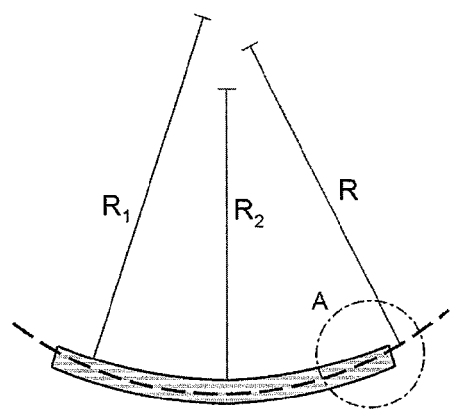
FIG. 2 is a side view illustrating a curved battery cell according to another embodiment of the present invention.

FIG. 2 is a side view typically illustrating a curved battery cell according to another embodiment of the present invention.

Referring to FIG. 2, the battery cell 102 is configured such that a radius of curvature $R_1$ of each end of the battery cell 102 is greater than a radius of curvature $R_2$ of the middle part of the battery cell 102.

Consequently, the battery cell 102 has an average radius of curvature R. The radius of curvature $R_2$ of the middle part of the battery cell 102 is less than the average radius of curvature R, and the radius of curvature $R_1$ of each end of the battery cell 102 is greater than the average radius of curvature R.

Figure 3:
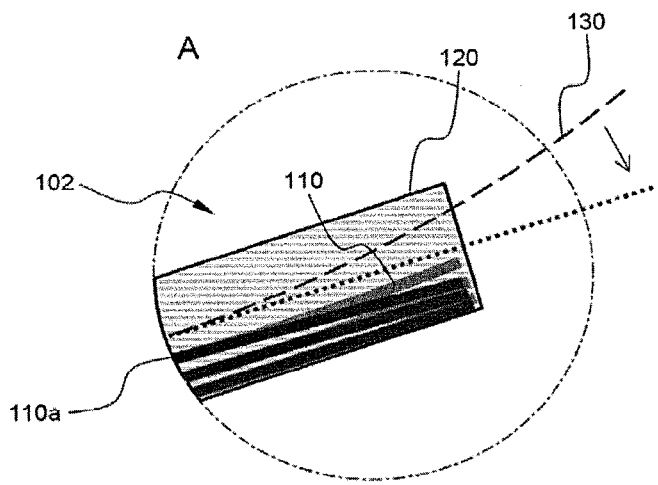
FIG. 3 is an enlarged view illustrating change of the battery cell at a portion A of FIG. 2 during repetitive charge and discharge of battery cell.

The effect obtained by the provision of the above structure can be confirmed from FIG. 3, which is an enlarged view illustrating a portion A of FIG. 2. FIG. 3 is an enlarged view typically illustrating change of the battery cell at a portion A of FIG. 2 during repetitive charge and discharge of battery cell.

Referring to FIG. 3, electrode plates 110 of an electrode assembly are curved in almost the same shape as a cell case 120. When the battery cell 102 is repeatedly charged and discharged, however, active materials (not shown) applied to the electrode plates 110 repeatedly expand and contract, with the result that the electrode plates 110 has a tendency to be restored to the original shape 110a thereof. On the other hand, the curved shape of the cell case 120 is maintained. Due to such restoration of the electrode plates, therefore, the ends of the respective electrode plates 110a are pressed by the inside of the cell case 120. However, the radius of curvature $R_1$ of each of the electrode plates 110a is large, with the result that restored strain is relatively small as compared with the radius of curvature R.

Specifically, the restored strain is approximately inversely proportional to the radius of curvature R. Consequently, the restored strain is large with respect to electrode plates 130 curved in the relative small radius of curvature R. For this reason, ends of the electrode plates 130 having the radius of curvature R may be pressed by the cell case 120, and therefore, the ends of the electrode plates 130 penetrate separators (not shown) disposed between the respective electrode plates 130, with the result that a short circuit may occur.

When the battery cell 102 is manufactured such that the battery cell 102 has the radius of curvature R throughout the battery cell 102, therefore, it is preferable to manufacture the battery cell 102 such that the radius of curvature $R_1$ of each end of the battery cell 102 is greater than the radius of curvature $R_2$ of the middle part of the battery cell 102, as shown in FIG. 2.

Figure 4:
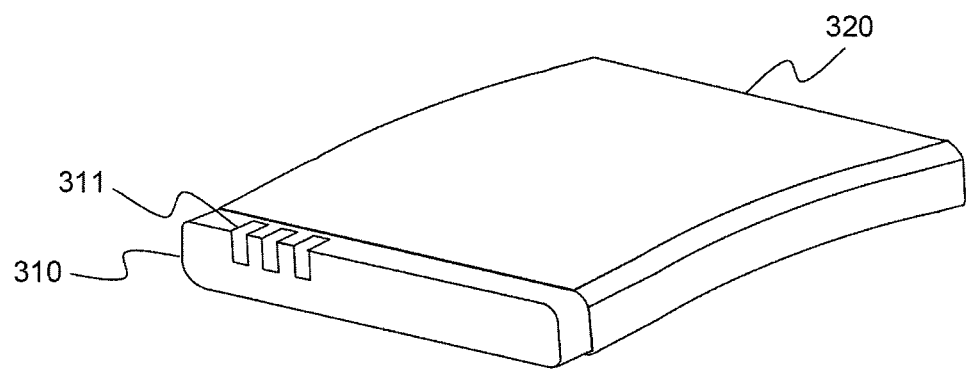
FIG. 4 is a perspective view illustrating a battery pack including the curved battery cell according to the embodiment of the present invention.

FIG. 4 is a perspective view typically illustrating a battery pack including the curved battery cell according to the embodiment of the present invention.

Referring to FIG. 4, a pack case of a battery pack includes a pack case body 320 gently curved in the axial direction thereof such that the pack case body 320 has the same shape as the battery cell (see FIG. 2), an upper end cap 310 mounted to the upper end of the pack case body 320, and a lower end cap (not shown) mounted to the lower end of the pack case body 320. The upper end cap 310 is provided with holes 311, through which external input and output terminals protrude outward.

Since the battery pack 300 has a predetermined curved shape, it is possible to mount the battery pack 300 in electronic devices having various curved designs, such as mobile phones. As a result, the internal space of each of the curved electronic devices is efficiently used, and therefore, it is possible to manufacture an electronic device configured in a structure in which the battery pack is mounted in the electronic device in a tight contact manner. Consequently, it is possible to develop electronic devices having various designs satisfying liking of consumers, thereby contributing to diversification of products.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the battery cell according to the present invention is configured such that the electrode assembly is mounted in the changeably cell case in a state in which the electrode assembly is impregnated with the electrolyte, and the electrode assembly and the cell case are curved in the same direction on the axial vertical sections thereof in a state in which the opposite ends of the electrode assembly and the opposite ends of the cell case are directed in the same direction about the middle part of the electrode assembly and the middle part of the cell case. Therefore, when the curved battery cell according to the present invention is mounted in an electronic device the external shape of which is curved or in an electronic device configured such that a battery mounting region is curved, the tight contact between the battery cell and the electronic device is achieved, thereby maximizing space utilization and thus providing high efficiency. Also, it is possible to develop electronic devices having various designs satisfying liking of consumers.

The invention claimed is:

1. A manufacturing method of a curved battery cell having a curved portion, comprising:
   (a) providing an electrode assembly in a chargeable battery cell;
   (b) placing the battery cell between upper and lower jigs having a predetermined radius of curvature and moving at least one of the upper and lower jigs toward the other of the upper and lower jigs to press the battery cell; and
   (c) separating the upper and lower jigs from each other to remove the battery cell from the upper and lower jigs,
   wherein the manufacturing method further comprises initially charging the chargeable battery prior to moving the upper and lower jigs toward each other.

2. The manufacturing method according to claim 1, wherein moving the at least one of the upper and lower jigs toward the other of the upper and lower jigs to press the battery cell is carried out at a temperature of 10 to 90° C.

3. The manufacturing method according to claim 1, wherein moving of the upper and lower jigs toward each other to press the battery cell is carried out at room temperature.

4. The manufacturing method of claim 1, wherein providing the electrode assembly in a chargeable battery cell comprises mounting the electrode assembly in a cell case, injecting an electrolyte into the cell case, sealing the cell case so as to manufacture the chargeable battery cell, and initially charging the battery cell.

5. The manufacturing method of claim 4, wherein providing the electrode assembly in a chargeable battery cell further comprises discharging the battery cell after initially charging the battery cell.

6. The manufacturing method of claim 1, wherein the electrode assembly is a cathode/separator/anode stack structure.

7. The manufacturing method of claim 1, wherein the entire chargeable battery has a radius of curvature R and the upper and lower jigs have a radius of curvature r that is less than the radius of curvature R.

8. The manufacturing method of claim 6, further comprising leaving the battery cell alone for a predetermined time such that a curved state of the battery cell is partially restored, and therefore, the battery cell has a radius of curvature R.

9. The manufacturing method according to claim 1, wherein moving of the upper and lower jigs toward each other to press the battery cell is carried out at a force of 150 to 500 kgF.

10. The manufacturing method according to claim 1, wherein a heater is mounted in at least one of the upper and lower jigs.

11. A manufacturing method of a curved battery cell having a curved portion, comprising:
   (a) providing an electrode assembly in a chargeable battery cell;
   (b) placing the battery cell between upper and lower jigs having a predetermined radius of curvature and moving at least one of the upper and lower jigs toward the other of the upper and lower jigs to press the battery cell; and
   (c) separating the upper and lower jigs from each other to remove the battery cell from the upper and lower jigs,
   wherein providing the electrode assembly in a chargeable battery cell comprises mounting the electrode assembly in a cell case, injecting an electrolyte into the cell case, sealing the cell case so as to manufacture the chargeable battery cell, and initially charging the battery cell, and
   wherein providing the electrode assembly in a chargeable battery cell further comprises discharging the battery cell after initially charging the battery cell.

\* \* \* \* \*